UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

GREEN-BLACK SULFUR DYE.

SPECIFICATION forming part of Letters Patent No. 648,754, dated May 1, 1900.

Application filed February 6, 1900. Serial No. 4,263. (No specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in Green-Black Dyestuffs, of which the following is a specification.

My invention relates to the manufacture of a new green-black coloring-matter which dyes cotton without the aid of a mordant.

This dyestuff is obtained by treating a certain meta-phenylendiamin derivative with sulfur and sodium sulfid. The said meta-phenylendiamin derivative results from the condensation in aqueous solution of one molecule of symmetrical dinitro-meta-di-chlorbenzene and two molecules of para-amido-phenol-ortho-sulfoacid in the presence of a body that will bind hydrochloric acid, such as sodium carbonate or acetate. In this way dinitro-di-para-hydroxy-di-phenyl-meta-phenylendiamin-di-sulfoacid is obtained which, judging from the manner of its formation, has the following constitutional formula:

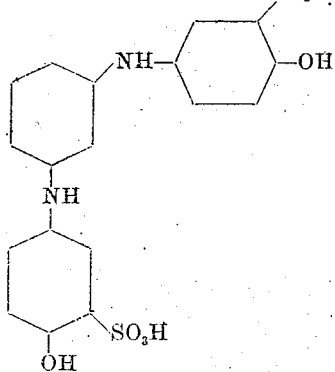

and this, when treated in the manner to be described with sulfur and sodium sulfid, yields the coloring-matter I desire to claim.

The following example will serve to further illustrate the manner in which my invention can be carried into practical effect and my new coloring-matter obtained. The parts are by weight.

*Production of green-black coloring-matter from dinitro-di-para-hydroxy-di-phenyl-meta-phenylendiamin-di-sulfoacid.*—Prepare the required initial material by heating to boiling in a reflux apparatus a mixture of one molecular proportion of dinitro-di-chlorbenzene and two molecular proportions of para-amido-phenol-ortho-sulfoacid, the latter dissolved in water, and sufficient sodium acetate to bind the hydrochloric acid formed during the reaction. Continue the heating for about four hours or until the dinitro-di-chlorbenzene has practically disappeared. Allow the liquid to cool and isolate the reaction product in any well-known manner. Mix together twenty (20) parts of the dinitro-di-para-hydroxy-di-phenyl-meta-phenylendiamin-di-sulfoacid thus obtained with forty (40) parts of sulfur, one hundred and twenty (120) parts of crystallized sodium sulfid, and five (5) parts of water in an iron vessel. Gradually heat the mixture to about 140° centigrade while stirring and maintain at this temperature until the melt has become quite dry. When cool, powder it up. In this condition it can be directly used for dyeing purposes, or it may be dissolved in a little water and the coloring-matter salted out with common salt. In this case it is necessary, when dyeing, to add soda, common salt, and sodium sulfid to the dyeing-bath in order to obtain the best results.

My new coloring-matter is readily soluble in water, its aqueous solution being green. Acids added to this solution produce a brown precipitate, which is redissolved by alkalies with a green color. It dyes unmordanted cotton a green black, which is exceedingly fast to soap, light, and acids. It is but little altered in fastness or shade by subsequent treatment with chromates, copper salts, and the like.

Now what I claim is—

The new coloring-matter which can be obtained from dinitro-di-para-hydroxy-di-phenyl-meta-phenylendiamin-di-sulfoacid, sulfur and sodium sulfid, whose solution in water is of a green color, dyeing unmordanted cotton a green black, which is not materially altered in shade or fastness by treatment with chromates and copper salts, and in which solution a brown precipitate is formed on the addition of hydrochloric acid, the said precipitate redissolving in alkalies with a green color substantially as described.

In testimony whereof I have hereunto set my hand in the presence of two subscribing witnesses.

PAUL JULIUS.

Witnesses:
  JACOB ADRIAN,
  ERNEST F. EHRHARDT.